Nov. 22, 1966 W. N. BOLT 3,286,362
HANDLING OF GOODS DURING PROCESSING OR TREATMENT
Filed Nov. 21, 1963 8 Sheets-Sheet 1

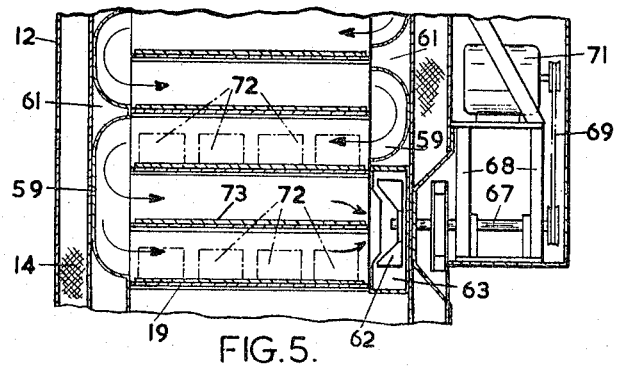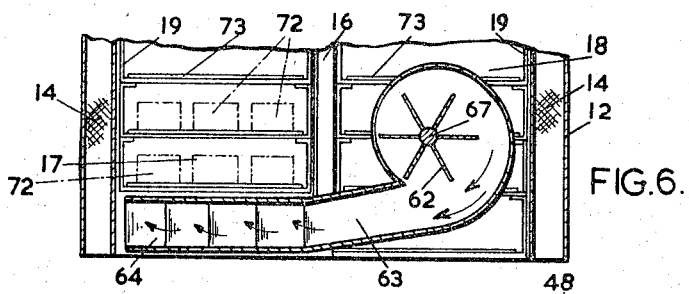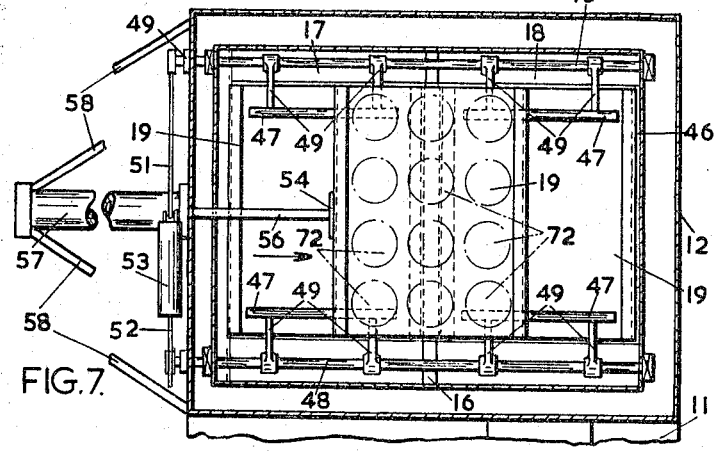

United States Patent Office 3,286,362
Patented Nov. 22, 1966

3,286,362
HANDLING OF GOODS DURING PROCESSING OR TREATMENT
William Noel Bolt, Holly House Farm, Great Sankey, Warrington, England
Filed Nov. 21, 1963, Ser. No. 325,419
Claims priority, application Great Britain, Nov. 27, 1962, 44,714/62
13 Claims. (Cl. 34—33)

This invention relates to the handling of goods, e.g., foodstuffs such as bread loaves, wrapped blocks of butter or ice-cream, biscuits or chocolates, or materials or substances used in the manufacture or processing of foodstuffs, e.g., blocks of fat, such goods being handled, e.g., transported from one place to another, while the goods are being treated or processed, e.g., heated, cooled, cooked, baked or sterilized.

Such processing or treatment of goods has usually necessitated the use of endless conveyor systems, either single or multi-tier, occupying considerable floor space, the length of such conveyors depending on the time needed for the proper treatment of the goods and the desired rate of production of the treated goods.

An object of the invention is to avoid the use of endless conveyors and to reduce the floor space occupied by an apparatus for treating or processing goods of a given kind at a given rate of production.

According to the present invention goods are handled while they are being treated or processed by arranging the goods on a succession of goods-supporting trays arranged in a vertical column, passing the successive trays through a treating or processing atmosphere by repeatedly indexing the column lengthwise a distance substantially equal to the pitch of the trays in the column and, after each indexing operation, transferring a charge of treated or processed goods from one end of the column to a delivery or intermediate station and passing a fresh charge of goods into the other end of the column.

The individual trays in the column may be separately supported, e.g., on spaced projections from a pair of parallel chains or the like. Conveniently, however, the stack is so arranged that each tray rests on the one below it.

The goods may be transferred by removing and replacing the trays themselves but it is found convenient to avoid removal of the trays from the processing atmosphere. This may be accomplished by arranging the goods on separate sheets and inserting the sheets into and removing them from the trays as required.

The treating or processing atmosphere will normally be enclosed in a treating or processing chamber. Thus, the trays may be fed in succession into the top of the chamber on to a column of trays already in the chamber on a supporting platform arranged to be lowered step by step through a distance substantially equal to the pitch of the trays in the column in timed relationship with the feeding of the trays on to the top of he column, supporting means moving into engagement with the tray next above the lowermost tray prior to each lowering movement of the platform, to support the column while the lowermost tray is transferred to a delivery station.

Alternatively, the feeding and transferring operations may be reversed, the trays being fed successively to the bottom of the column and successive trays being transferred from the top of the column. In such a case, the supporting platform will lift the column through a distance substantially equal to the pitch of the trays, the supporting means then operating to hold the column while the platform is lowered to receive the next tray to be added to the bottom of the column.

The chamber surrounding the column conveniently provides for the flow of air or other treating or processing medium upwardly or downwardly past opposite sides of the trays, the latter being so constructed as to allow the flow of treating or processing medium from the sides of the chamber into spaces between the trays, baffles being arranged in the sides of the chamber at alternate ends of the trays to direct the air over the goods on each tray in succession. The step by step movement of the column upwards or downwards as described above, results in the goods on each tray being subjected to the flow of treating medium alternately in opposite directions, and by suitably arranging the baffles and the supply and extraction points for the treating medium, different temperatures or atmospheric conditions may be brought about over the height of the column.

The trays are conveniently each in the form of a flat sheet with portions upstanding from opposed sides somewhat higher than the height of the goods to be treated or processed so as to provide support for the next tray above and to allow adequate space for the flow of treating medium over the goods, the latter, when constituted by a number of individual articles, being arranged on the trays in spaced relationship. Thus, opposed marginal edges of the sheets may be turned up to form channel-shaped trays with open ends, with the extremities of the opposed marginal edges turned inwardly to form good support for the successive trays. The walls of the treating chamber will, of course, provide or be provided with suitable guides for the edges of the trays so as properly to locate them during their passage through the chamber.

Considerations of building height, total loading conditions, positional relationship between feed and discharge points, or other considerations may make it inconvenient to use a single column, and in such circumstances, a number of columns may be used. Thus, two juxtaposed columns may be arranged, each operating step-by-step as described above, the trays being fed to the bottom of one column, transferred from the top of the first to the top of the second column and discharged from the bottom of the second column. Alternatively, the feeding and discharge of the trays may take place at the top of the columns and the transfer at the bottom. A third juxtaposed column may provide for bottom feeding and top discharge or vice versa, and so on for any number of columns.

When using a pair of columns, the step-by-step action is much facilitated by supporting the columns on a pair of platforms connected by a parallel-motion linkage to a pivoted beam at equidistant points so that the two columns are normally in substantial balance, the entire load being carried by the beam pivot. A pair of hydraulic rams, pivotally connected to the ends of the beam, may provide the necessary power for rocking the beam to provide the necessary lifting and lowering actions in the two columns simultaneously.

Instead of supporting the two columns on a beam in the above manner, each platform may have its own hydraulic ram, substantial balance being brought about in such a case by connecting both rams in the same hydraulic circuit with a common pump and fluid supply to provide for individual ram movement or a hydraulic balance as required.

The lifting and lowering actions of the two columns may, of course, be performed by purely mechanical means as an alternative to the hydraulic mechanism described above.

When used for canning, sterilizing or like processes where steam under appreciable pressure is used, the pair of columns may be arranged side by side in a pressure chamber closed at the top and open at the bottom, the lower end of the chamber being submerged in a water tank having a depth of water sufficient to provide a head of water to balance the steam pressure in the chamber. In such a case, trays are fed to and discharged from the columns by means of feed and discharge columns arranged adjacent the main columns and extending from the base of the main columns to a level above the water line.

It will be understood that the various movements are operated in timed relationship with each other and may occur as a complete co-ordinated cycle, or each action may be utilized to trigger off the next until the cycle is complete, the last motion then triggering off the first to commence another sequence of operations.

By way of example, the invention will now be described in greater detail with reference to the accompanying diagrammatic drawings as applied to an apparatus intended for the baking of meat pies.

Figure 1:
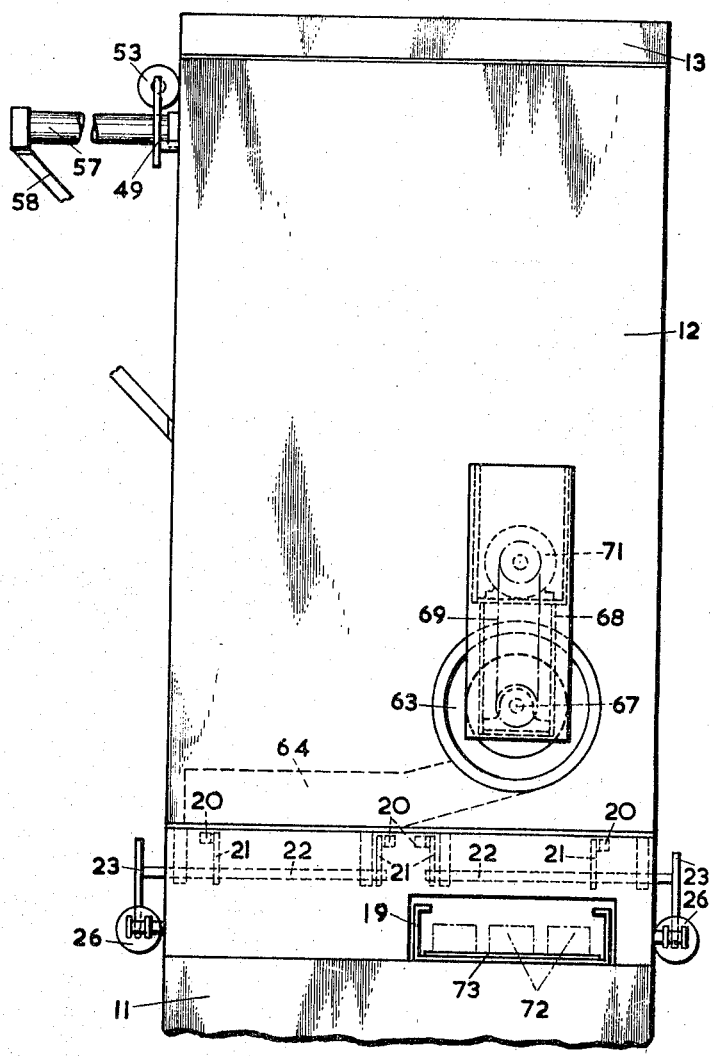
FIGURE 1 is a front elevation of the apparatus.
Figure 3:
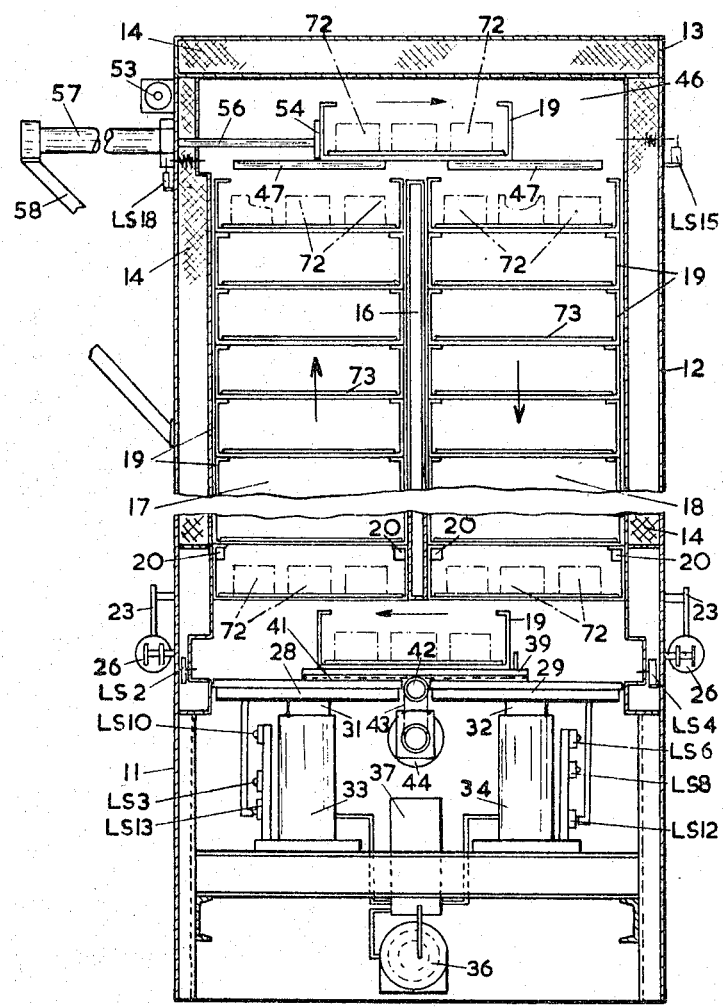
FIGURE 3 is a part-sectional front elevation.
Figure 4:
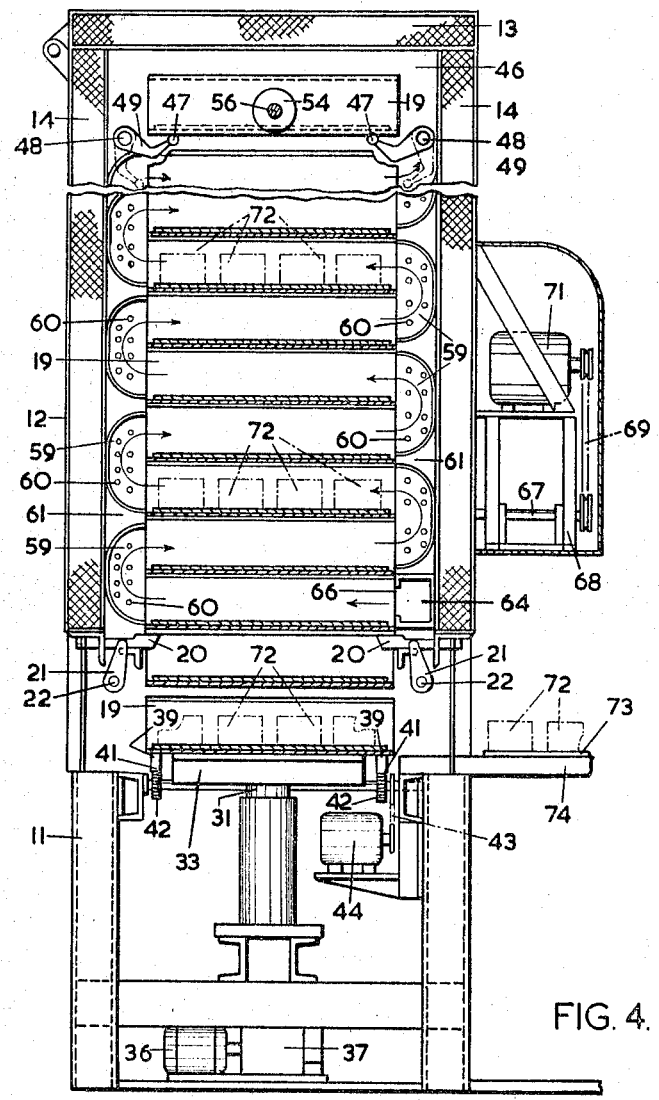
FIGURE 4 is a part-sectional side elevation.
Figure 8:
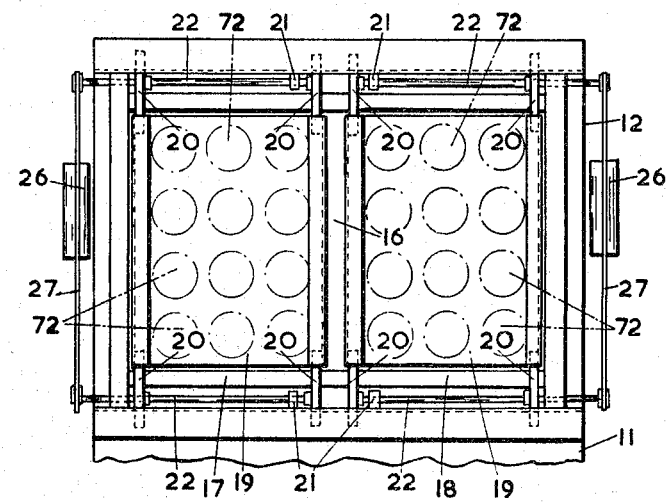
Figure 9:
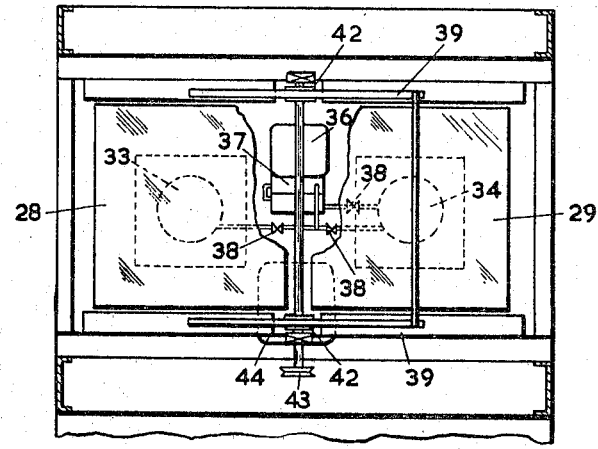
Figure 10:
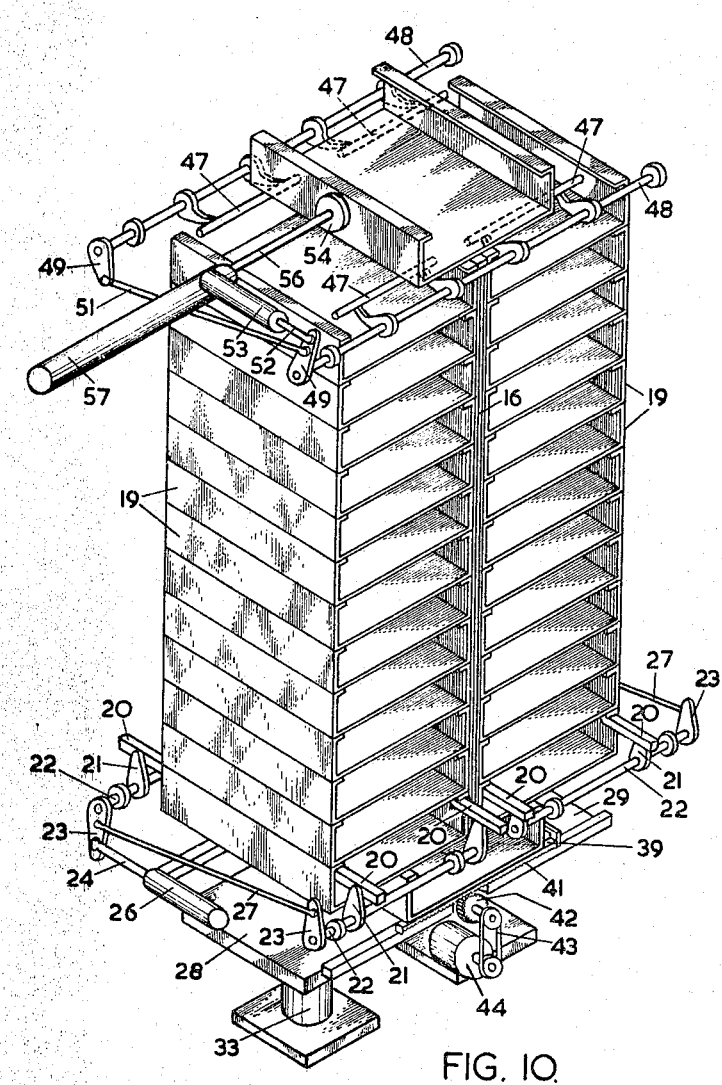
Figure 11:
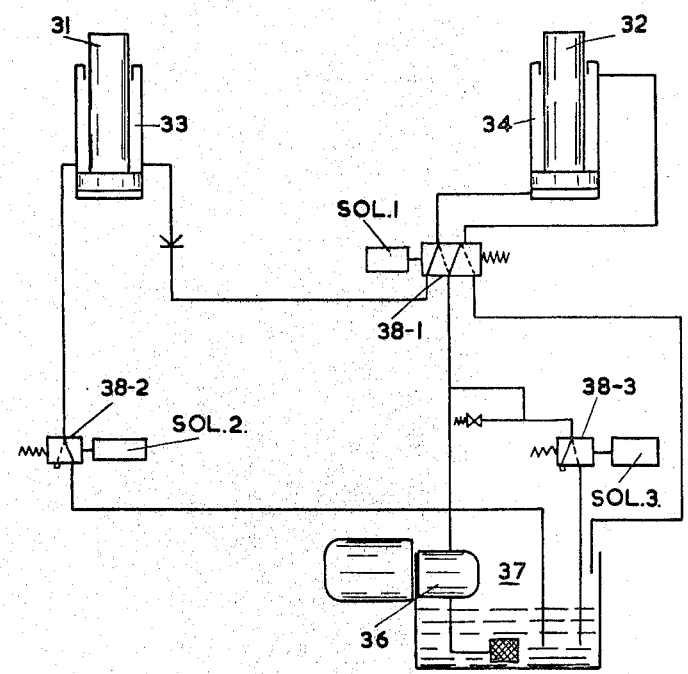

FIGURE 5 is a part-sectional side elevation in a different plane to that of FIGURE 4, FIGURE 6 is a part-sectional front elevation of part of the apparatus shown in FIGURE 5, FIGURE 7 is a plan of the apparatus shown in FIGURES 1 and 3 with part of the upper structure removed, FIGURE 8 is a similar plan at a lower level, FIGURE 9 is a similar plan at an even lower level, FIGURE 10 is an isometric view of the apparatus with the outer wall structure and framework removed, and FIGURE 11 is a diagram of the hydraulic system.

The apparatus is fabricated from metal sections and sheet metal and for convenience in manufacture consists generally of three parts 11, 12 and 13, the part 11 being the lower one housing the general loading and delivery mechanism, part 12 being the baking chamber and part 13 constituting a hinged lid.

The baking chamber 12 is adequately sealed from the lower housing portion 11 so as to avoid heat wastage. The walls of the chamber 12 and the lid 13 are formed hollow and filled with insulating material 14, the chamber 12 being formed with a centre partition 16 to divide the chamber into two compartments in which are accommodated two columns 17 and 18 of trays 19 each of which rests on the one below it, the outer walls and the partition 16 forming adequate guideways for the trays.

The column 17 is arranged to ascend and the column 18 is descend in a step-by-step movement in the manner described below, and during the time that the columns remain stationary, they are supported on movable latch members 20 housed in suitable bearings in the side walls of the apparatus, the latch members 20 being operated by arms 21 carried by pairs of rotatable shafts 22 which also carry arms 23 connected to the piston rods 24 of air cylinders 26. The arms 23 on one pair of shafts 22 only are operated by the air cylinders 26, the arms 23 on the other pair of shafts 22 being operatively connected by links 27.

Arranged below the columns 17 and 18, respectively, are supporting tables 28 and 29 carried by rams 31 and 32 housed in hydraulic cylinders 33 and 34, respectively, the cylinders 33 and 34 being supplied with hydraulic fluid by a motor pump unit 36 from a supply tank 37. Valves 38–1, 38–2 and 38–3, operated by solenoids SOL 1, SOL. 2, and SOL. 3 control the operation of the rams 31 and 32 in the manner described below, a non-return valve 30 and pressure relief valve 35 being provided in the system.

Mounted in a suitable slideway below the columns 17 and 18 is a transfer pusher 39 movable from a loading and unloading position directly below the column 18 to a transfer position directly below the column 17, the pusher 39 being provided with toothed racks 41 meshing with a pair of pinions 42 mounted on a common shaft and connected by belt gearing 43 to a driving motor 44.

In a transfer chamber 46 above the columns 17 and 18 is a lifting mechanism consisting of rods 47 extending from shafts 48 pivotally mounted in suitable bearings in the side walls of the chamber 12, the shafts being connected for simultaneous pivotal movement by arms 49 and link 51, the latter being operatively connected to an air piston 52 housed in an air cylinder 53. Also mounted in the chamber 46 for movement transversely of the columns 17 and 18 is a transfer pusher 54 secured to an air piston 56 housed in an air cylinder 57 attached to a side wall of the chamber 12 and supported by struts 58.

Heat for that part of the chamber 12 housing the ascending column 17 is provided by a series of electrical heating elements 60 disposed in a series of baffle chambers 59 formed in baffle walls 61 secured to the inside front and rear walls of the chamber 12, the chambers 59 on one side being offset in relation to those on the opposing side to the extent that hot air passes alternately to opposite sides of the chambers 17 and 18. The pies in the trays are, therefore, subjected to the baking effect of the hot air travelling alternately in opposite directions as the trays carry out their stepwise movement.

The air passing through the successive chambers 59 is re-heated during its passage between the successive trays 19. With rising heat and circulated hot air, the pies in the top tray 19 of column 17 will generally have reached approximately maximum temperature, the pies at this stage being about half way through the cooking cycle. The trays 19 thus pass to the column 18 at maximum temperature and in passing down that column do not normally require additional heat, so that hot air drawn from the column 17 is generally adequate, without the provision of heating elements in the compartment of the chamber 12 housing the column 18, to complete the baking cycle.

The hot air is circulated by a fan 62 arranged in a suction chamber 63 disposed towards the bottom of the column 18 to draw air across the two lowermost trays 19 and force it along a duct 64 to an inlet port 66 towards the bottom of the column 17. The fan is secured to a rotatable shaft 67 mounted in bearings in a framework 68 secured to the front wall of the chamber 12, the shaft 67 being driven by belt gearing 69 from a motor 71 mounted on the framework 68. The hot air is thus caused to pass firstly up the column 17 into the chamber 46 and then down the column 18 to the suction chamber 63 from which it is re-circulated.

Pies 72 arranged in spaced relationship on supporting sheets 73 are manually fed into and removed from the tray 19 for the time being at the bottom of the stack 18 from and on to a feed and delivery table 74. The operation of the apparatus is semi-automatic and the complete cycle of operations is controlled by a series of limit switches, relays and solenoids all operating in well-known manner to stop each operation on completion and start the succeeding operation until the cycle is complete, the cycle being restarted by either the operator's starter switch or by an impulse from a limit switch indicating that the unloading and re-loading operation is complete. The electrical mechanism is, therefore, shown diagrammatically and referred to only briefly in the following description of the operation of the apparatus. When the main switch in the electrical system is switched on, the motor and pump unit 36 is started and runs continuously, the valves 38–2 and 38–3 remaining open to atmosphere during the periods when hydraulic power is not required, thus allowing the pump to idle.

Assuming the apparatus to be fully charged with both columns 17 and 18 supported on the latches 20, one tray 19 available for transfer in the chamber 46, and one tray 19 containing a sheet of cooked pies resting on the carriage 39 below the column 18 ready for unloading and reloading, the operator removes the sheet 73 from that tray and inserts a fresh sheet of uncooked pies. The operator then depresses the starter switch S. 1 to start the cycle of operations. The switch S. 1 starts the motor 44 to drive the pusher 39 into position under the column 17 where it actuates a limit switch L.S. 2 which stops the motor 44 and restarts it in the opposite direction returning the pusher 39 to its original position, ready to receive the next tray, when it depresses a limit switch L.S. 4 which energises the solenoids SOL. 2 and SOL. 3 to close the valves 38–2 and 38–3. The valve 38–1 is held by spring return in a position to connect the pressure line to the bottom end of cylinder 34 and the exhaust line to the top end of cylinder 34. The ram 32 in the cylinder 34 is driven upwards to the top of its stroke, where it depresses a limit switch L.S. 6, and takes the load of the column 18. The limit switch L.S. 6 also provides an impulse which causes a solenoid SOL. 26 to be energised to actuate the controlling valve of the air cylinder 26 of the column 18 to cause the piston 24 of that cylinder to actuate the linkage in a direction to retract the latches 20 formerly supporting the column 18. Completion of the latch retraction stroke of the piston 24 causes the link 27 to depress the limit switch L.S. 7 which energises the solenoid SOL. 1 to actuate the valve 38–1 to connect the bottom end of the cylinder 34 with the bottom end of the cylinder 33, and at the same time to connect the top end of the cylinder 34 with the pressure line from pump unit 36, such action drives down the ram 32 thereby raising the ram 31. During this operation the columns 17 and 18 are generally in balance.

When the ram 32 has descended some 2 inches it depresses a limit switch L.S. 8 which energises a solenoid SOL. 24 to cause the operation of the piston 24 in the air cylinder 26 of the column 18 to actuate the linkage in a direction to re-engage the latches 20 under the column 18. The ram 32 continues its downward movement to the bottom of its stroke leaving the column 18 supported on the latches 20 of that column except for the lowermost tray 19 now lying on the support table 29 carried by the ram 32, that tray 19 lying quite clear of the next lowermost tray in column 18. On completing its downward movement, the ram 32 depresses a limit switch L.S. 12 wired in sequence with the limit switch L.S. 13.

Meanwhile the ram 31 in the cylinder 33 is being driven up. After rising a short distance, it takes the load of the column 17 and depresses a limit switch L.S. 3 to energise a solenoid SOL. 27 which causes the piston 24 of the air cylinder 26 of the column 17 to actuate the linkage to withdraw the latches 20 normally supporting the column 17.

With the lowering of the ram 32, the ram 31 rises to lift the column 17 to cause the freshly loaded tray 19 to be moved into latch-receiving position and at the same time to cause the uppermost tray 19 of that column to pass into the transfer chamber 46. When the ram 31 reaches the top of its stroke, it depresses a limit switch L.S. 10 to de-energise the solenoid SOL. 27 and thus reverses the action of the piston 24 of the column 17 so as to engage the latches 20 under the column 17.

As the latches 20 of the column 17 become re-engaged, the link 27 of that column depresses a limit switch L.S. 11 which de-energises the solenoids SOL. 1, SOL. 2 and SOL. 3 of the valves 38–1, 38–2 and 38–3 thus releasing pressure in the system thereby lowering the ram 31. At this stage, the ram 32 is already down and is prevented from rising again by a non-return valve inserted in the line from the cylinder 34 to the cylinder 33. As the ram 31 completes its downward stroke it depresses a limit switch L.S. 13 which, in sequence with a limit switch L.S. 12 provides an impulse to start the cycle of operations in the top of the machine as described below.

Figure 2:
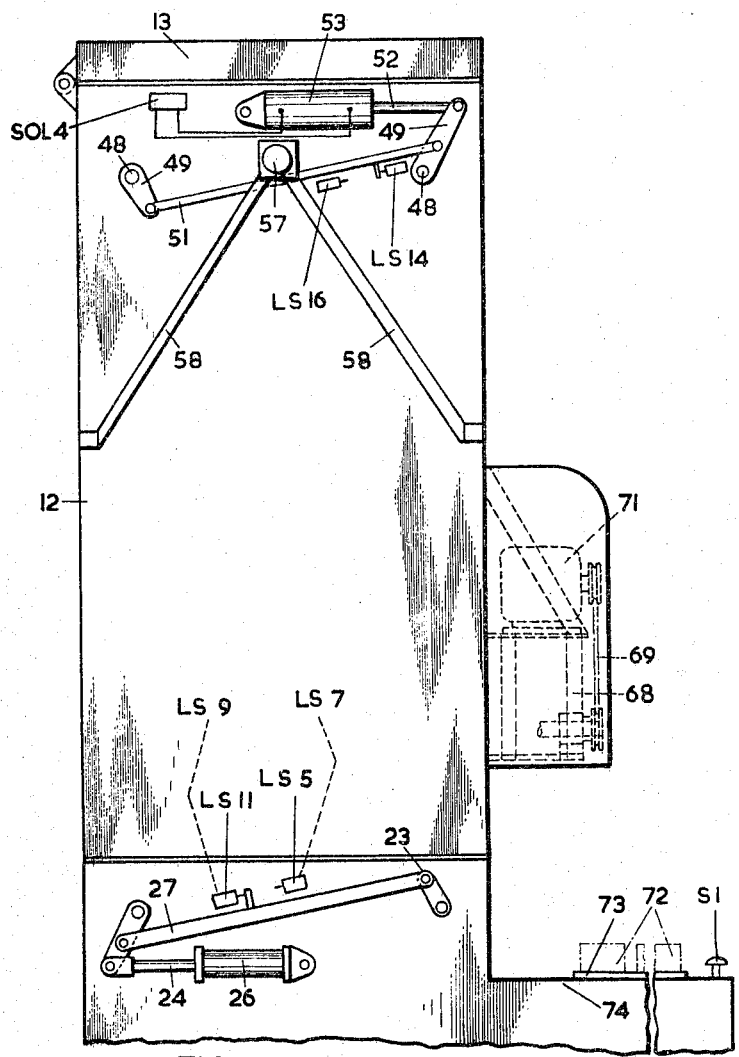
FIGURE 2 is a side elevation.

FIGURE 2 shows limit switches L.S. 5 and L.S. 9, arranged to provide an impulse to signal that the latches 20 under the column 17 have retracted and the latches 20 under the column 18 have engaged, respectively, are wired into the system as a safety precaution to stop operations in the event of failure of the latches 20 to perform their respective functions, thereby preventing possible damage to the trays. These are typical of a number of switches which would normally be added as safeguards but are omitted from this description for simplification. The switch L.S. 13 also energises a solenoid SOL. 4 arranged to cause actuation of the piston 52 of the air cylinder 53 to cause the rods 47 to move upwardly to lift the tray 19 in the chamber 46 clear of the column 17. Completion of the lifting movement of the piston 52 actuates a limit switch L.S. 14 which energises a solenoid SOL. 5 arranged to cause actuation of the piston 56 in a direction to move the transfer pusher 54 in a direction to move the tray 19 along the rods 47 into position above the column 18 where it actuates a limit switch L.S. 15 which breaks the circuit of the solenoid SOL. 4 to reverse the action of the piston 52 thus returning the rods 47 to their inoperative positions, the rods 47 lowering the tray 19 on to the upper tray of the column 18.

When the rods 47 have completed their lowering movement, the link 51 depresses a limit switch L.S. 16 which provides the impulse to de-energise a solenoid SOL. 5 for reversing the controlling valve of the cylinder 57 and so actuating the piston 56 in reverse to retract the pusher 54. As the pusher 54 reaches its inoperative position, it actuates a limit switch L.S. 18 which completes the circuit to the starter switch S. 1. Thus, during this transferring action, the circuit of the solenoid of the switch S. 1 remains broken to ensure that the hydraulic system cannot come into operation during the transferring action.

Though electrical heating elements have been described and shown in the above example, it will be understood that other forms of heating may be used, additional space being provided if necessary between the inner walls of the chamber 12 and the trays 19 for the provision of suitable ducts or flues. Alternatively, when the process is one of cooling, drying or freezing, a separate plant for the treatment of processing air or other media may be installed adjacent the processing chamber.

I claim:

1. Method of processing goods, comprising arranging the goods on supporting trays open at their ends and disposed one above the other in two juxtaposed columns in a processing chamber, repeatedly indexing the columns lengthwise a distance substantially equal to the pitch of the trays in the columns, one column being indexed upwardly and the other downwardly, continuously forcing a processing medium into the open end of the lowermost tray in the upwardly indexed column, guiding the processing medium issuing from the opposite end of that tray into the adjacent open end of the tray next above in that column, repeating the guiding action at each end of each successive tray in the column so that, as the column is indexed, the processing medium travels alternately along the successive trays in opposite directions, guiding the processing medium issuing from the uppermost tray in the upwardly indexed column into an open end of the uppermost tray in the downwardly indexed column, guiding the procesing medium issuing from the opposite end of that tray into the adjacent open end of the tray next below in that column, repeating the guiding action at each end of each successive tray in that column so that, as the column is indexed, the processing medium travels along the successive trays in opposite directions, and, after such indexing operation, transferring the uppermost tray in the upwardly indexed column to the top of the downwardly indexed column, transferring a charge of processed goods from the lower end of the downwardly indexed column to a delivery station and passing a charge of unprocessed goods into the lower end of the upwardly indexed column.

2. Apparatus for processing goods comprising a processing chamber, a succession of open-ended goods-supporting trays arranged one above the other in a column in said chamber, means for repeatedly indexing the column lengthwise a distance substantially equal to the pitch of the trays in the column, blowing means for continuously forcing a processing medium into the open end of a tray at one end of the column, a series of baffle walls formed in opposite walls of said chamber and so disposed as to guide the stream of processing medium issuing from the opposite end of said end tray successively into and through the remaining trays in the column, means operable after each indexing operation for transferring a tray containing a charge of processed goods from one end of the column to a next station and means similarly operable after each indexing operation for transferring a tray containing a charge of unprocessed goods to the other end of the column.

3. Apparatus for processing goods, comprising a processing chamber formed with two juxtaposed compartments communicating with each other at their ends, a plurality of open-ended goods-supporting trays arranged one above the other in two juxtaposed columns in said compartments, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column.

4. Apparatus for processing goods, comprising a processing chamber formed with two juxtaposed compartments communicating with each other at their ends, an indexing platform at the base of each compartment, a plurality of open-ended goods-supporting trays arranged one above the other in two columns supported one on each indexing platform, means for repeatedly indexing the platforms upwardly and downwardly in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom a charge of unprocessed goods and reloading it with a charge of processed goods, to the lower end of the upwardly indexed column, the indexing means so connecting the two platforms for simultaneous operation that the two columns of trays substantially balance each other during the indexing operations.

5. Apparatus for processing goods, comprising a processing chamber formed with two juxtaposed compartments communicating with each other at their ends, indexing platform at the base of each compartment, a plurality of open-ended goods-supporting trays arranged one above the other in two columns supported one on each indexing platform, hydraulic means for repeatedly indexing the platforms upwardly and downwardly in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column after unloading therefrom a charge of processed goods and re-loading it with a charge of unprocessed goods, to the lower end of the upwardly indexed column, the indexing means so connecting the two platforms for simultaneous operation that the two columns of trays substantially balance each other during the indexing operations.

6. Apparatus for processing goods comprising a processing chamber, a succession of open-ended goods-supporting trays arranged one above the other in a column in said chamber, means for repeatedly indexing the column lengthwise a distance substantially equal to the pitch of the trays in the column, blowing means for continuously forcing a processing medium into the open end of a tray at one end of the column, a series of baffle walls formed in opposite walls of said chamber and so disposed as to guide the stream of processing medium issuing from the opposite end of said end tray successively into and through the remaining trays in the column, means operable after each indexing operation for transferring a tray containing a charge of processed goods from one end of the column to a delivery or intermediate station, means similarly operable after each indexing operation for transferring a tray containing a charge of unprocessed goods to the other end of the column, and retractable latch mechanism adapted to engage the lower tray in the column to support the column during the transferring operations.

7. Apparatus for processing goods, comprising a processing chamber formed with two juxtaposed compartments communicating with each other at their ends, a plurality of open-ended goods-supporting trays arranged one above the other in two juxtaposed columns in said compartments, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in that other column and then succesively into and through the remaining trays in that other column, means operable in timed relationship with the indexing means and after each indexing operation for transferring the uppermost tray in the upwardly indexed column to the top of the downwardly indexed column and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column, and retractable latch mechanism adapted to engage the lower trays in the columns to support the columns during the transferring operations.

8. Apparatus for processing goods, comprising a processing chamber formed with two juxtaposed compartments communicating with each other at their ends, an indexing platform at the base of each compartment, a plurality of open-ended goods-supporting trays arranged one above the other in two columns supported one on each indexing platform, means for repeatedly indexing the platforms upwardly and downwardly in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column, and retractable latch mechanism adapted to engage the lower trays in the columns to support the columns during the transferring operations.

9. Apparatus for processing goods, comprising a processing chamber formed with two juxtaposed compartments communicating with each other at their ends, a plurality of open-ended goods-supporting trays arranged one above the other in two juxtaposed columns in said compartments, the trays being arranged to be loaded and unloaded by means of separate sheets each containing a charge of goods, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom the sheet of processed goods and reloading it with a sheet of unprocessed goods, to the lower end of the upwardly indexed column.

10. Apparatus for processing goods, comprising a processing chamber formed with two juxtaposed compartments communicating with each other at their ends, a plurality of open-ended goods-supporting trays arranged one above the other in two juxtaposed columns in said compartments, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column, and lifting mechanism at the top of the chamber for lifting the uppermost tray of the upwardly indexed column to a level clear of both columns prior to the operation of the transfer mechanism.

11. Apparatus for processing goods, comprising a processing chamber formed with two juxtaposed compartments communicating with each other at their ends, a plurality of open-ended goods-supporting trays arranged one above the other in two juxtaposed columns in said compartments, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column, and lifting mechanism at the top of the chamber for lifting the uppermost tray of the upwardly indexed column to a level clear of both columns prior to the operation of the transfer mechanism, said lifting mechanism including transverse rails movable into engagement with the base of the uppermost tray in the upwardly indexed column, said rails constituting a slideway along which the tray is slid by the transfer mechanism.

12. Apparatus for processing goods, comprising a processing chamber formed with two juxtaposed compartments communicating with each other at their ends, a plurality of open-ended goods-supporting trays arranged one above the other in two juxtaposed columns in said compartments, means for repeatedly indexing the columns lengthwise in opposite directions a distance substantially equal to the pitch of the trays in the columns, blowing means for continuously forcing a processing medium into the open end of the lowermost tray in the upwardly indexed column, a series of baffle walls formed in opposite walls of said compartments and so disposed as to guide the stream of processing medium issuing from the opposite end of said lowermost tray firstly successively into and through the remaining trays in that column, then from the uppermost tray in that column to an open end of the uppermost tray in the other column and then successively into and through the remaining trays in that other column, means operable in timed relationship with the indexing means and after each indexing operation for transferring the uppermost tray in the upwardly indexed column to the top of the downwardly indexed column, and means similarly operable in timed relationship with the indexing means for transferring the lowermost tray in the downwardly indexed column, after unloading therefrom a charge of processed goods and reloading it with a charge of unprocessed goods, to the lower end of the upwardly indexed column, and lifting mechanism at the top of the chamber for lifting the uppermost tray of the upwardly indexed column to a level clear of both columns prior to the operation of the transfer mechanism, said lifting mechanism comprising pairs of lifting rods mounted on pivoted arms carried by common shafts and means for rocking the arms to cause the rods to engage the underside of the uppermost tray in the upwardly indexed column, said rods constituting a slideway along which the tray is slid by the transfer mechanism.

13. Apparatus as in claim 4, wherein the lowermost tray in the downwardly indexed column is transferred from the indexing platform of that column on to the indexing platform for the upwardly indexed column, while both columns are supported clear of the indexing platforms by latch members, by a reciprocating pusher.

References Cited by the Examiner

UNITED STATES PATENTS

| | | | |
|---|---|---|---|
| 241,840 | 5/1881 | Bowen, et al. | 34—189 |
| 1,805,029 | 5/1931 | Baker | 198—85 |
| 3,018,742 | 1/1962 | Ward | 107—55 |

FREDERICK L. MATTESON, Jr., *Primary Examiner.*

A. D. HERRMANN, *Assistant Examiner.*